United States Patent [19]

Nelson et al.

[11] Patent Number: 4,516,934
[45] Date of Patent: May 14, 1985

[54] WASTE HEAT RECOVERY FROM REGENERATIVE FURNACES

[75] Inventors: Frederick J. Nelson, Swanton; Ray S. Richards, Sylvania, both of Ohio

[73] Assignee: Owens-Illinois, Inc., Toledo, Ohio

[21] Appl. No.: 555,249

[22] Filed: Nov. 25, 1983

[51] Int. Cl.³ .......................... F24H 7/00; F27D 17/00
[52] U.S. Cl. ........................................ 432/30; 432/180
[58] Field of Search .................... 432/29, 30, 179, 180

[56] References Cited

U.S. PATENT DOCUMENTS 4,030,877 6/1977 Robinson ............................. 432/29

FOREIGN PATENT DOCUMENTS 903404 10/1945 France ................................. 432/29

Primary Examiner—John J. Camby
Attorney, Agent, or Firm—John R. Nelson

[57] ABSTRACT

A system for recovering clean hot air from a regenerative, glass melting furnace. The furnace, which may be either a side-port or end-port furnace, is constructed in the conventional manner, but a passageway is provided which connects accross the top chambers of the furnace. This passage, at its center, is connected to a heat exchanger, and hot air will pass through the heat exchanger while the furnace is being operated with either side being the firing side while the opposite side is the exhaust side. No valving is necessary to isolate the passage from the exhaust side because of the natural pressure drop existing thereacross.

7 Claims, 2 Drawing Figures

WASTE HEAT RECOVERY FROM REGENERATIVE FURNACES

BACKGROUND OF THE DISCLOSURE

The present invention relates to new and useful improvements in regenerators for industrial furnaces and especially glass melting furnaces. It is among the objects hereof to provide a method of operating a regenerator of the conventional checker tile and brick construction having a substantial array of air preheat surfaces to obtain maximum use of the sensible heat in the waste gas stream passed through the regenerator structure.

A supplemental volume of air is passed through the regenerator preheat surfaces in addition to the volume of combustion air required for the furnace fuel combustion under normal operating conditions and this supplemental volume after being heated is divided therefrom for passage to an auxiliary heat-utilizing apparatus mounted exteriorly of the furnace. The air is preheated as a unitary stream of substantial volume during its passage through the hot heat-exchanging surfaces of the regenerator and prior to diversion of at least one secondary portion to the auxiliary heat-utilizing apparatus. The heat recovery structure of the regenerator requires no modification except for providing an outlet duct for the stated secondary portion of preheated air, preferably in a region adjacent to the furnace combustion zone. Thus, the auxiliary heat-utilizing apparatus can be supplied with clean preheated air having a temperature ranging from about 1000° to 2000° F., for example, which can be passed through a heat exchanger and employed for power generation or other purposes without unduly penalizing furnace operating conditions.

In the system proposed, additional heat recovery from the waste gas manifests itself in the form of colder waste gas exhausting from the regenerator system. The auxiliary air stream, along with the normal combustion air stream, removes more heat from that which is stored in the regenerator refractories than would occur with combustion air only, thus cooling the storage media to colder temperatures. During the subsequent reversal of the regenerator system, the colder media are capable of absorbing more energy from the waste gas, thus exhausting the waste gas from the system at a colder temperature. The net effect is the transfer of heat from the dirt-laden waste gas stream to an auxiliary clean air stream extracted from the alternating air side of the system. A net energy savings is realized if the extracted hot air stream is delivered to a reasonably efficient heat exchanger or other heat-utilizing process or apparatus other than the combustion chamber generating the original waste gas.

Furnace waste heat recovery devices and systems normally involve insertion of heat exchangers into the waste gas exhaust stream. Deposition of particulate matter from the waste gas stream on heat-exchanger components leads to fouling and corrosion, thus requiring costly construction and soot blowing, flushing or other cleaning systems to maintain a high level of heat exchanger performance. The subject process yields auxiliary waste heat recovered without passing dirty waste gas through an auxiliary heat exchanger, thus avoiding complications associated with particulates and acids condensed from dirty furnace waste gas. The presence of the auxiliary air stream tends to yield a slight reduction in the combustion air preheat temperature. A net energy savings can be realized if the use of the extracted air stream offsets the loss of combustion air preheat energy. Many heat exchange devices readily fulfill this requirement. The subject air extraction process eliminates the problems associated with dirty furnace waste gas which tends to foul such devices and prevent their long-term continuous efficient operation.

For a regenerative glass furnace melting conventional glass batch, the combustion chamber waste gas contains more energy than can be utilized for preheating combustion air. Most of the excess energy is normally evidenced by excessively hot stack gases. The subject method consists of supplying additional or auxiliary air, in excess of combustion air requirements, to the alternating air intake side of the regenerator inlet. Together with the combustion air, the auxiliary air stream is heated by the regenerator refractory surfaces. Rather than permitting the auxiliary air stream to pass through the combustion chamber as unused excess air, the stream is extracted from the air regenerator through an opening or a series of openings in the regenerator wall leading to a duct which carries the hot air to the desired auxiliary heat exchanger. The duct extends between the two regenerators, with a "T" connected intermediate the length of the connecting duct. During operation and with the normal reversals, the combustion or air side regenerator is always at an elevated pressure while the waste gas side is always at a slightly negative pressure. The "T" connection is maintained at zero or slightly negative pressure by a stack fan so that the extracted auxiliary hot gas is always obtained from the air intake side of the system.

SUMMARY OF THE INVENTION

This invention concerns the use of furnace combustion air preheat devices, i.e., regenerators in a reversing type furnace, to recover waste heat in the form of clean hot air stream for use in auxiliary heat-recovery devices, without requiring the use of expensive, heat-resistant valves. Thus, a basic advantage of the present invention involves the extraction of useable quantities of energy in the form of an auxiliary preheated air stream from the combustion air portion of the furnace system.

Another object of the present invention is to provide a method of deriving a significant amount of waste heat from the clean air side of the hot checkerwork region of a reversing cycle regenerator type furnace in regulatable quantities without requiring the use of expensive high temperature valves. A supplemental hot clean air stream is obtained from the heated surfaces of the regenerator which can be diverted to achieve maximum utilization of the heat stored in the stream.

A still further object of the invention is to provide a method of recovering furnace waste gas energy in a clean form for use in a wide variety of auxiliary heat-requiring devices.

Reference may be had to copending U.S. Pat. No. 4,407,669, issued Oct. 4, 1983, of common assignee with the present application, which discloses a number of computer studies made of a glass melting furnace operating to melt 180 tons of soda-lime glass per day at four simulations, the data employed in the model study being that derived from the operation of an actual furnace of improved design. This data and the four energy balance simulations made and disclosed in the above-referred-to application are incorporated herein by reference.

DETAILED DESCRIPTION OF THE DRAWINGS

Figure 1:
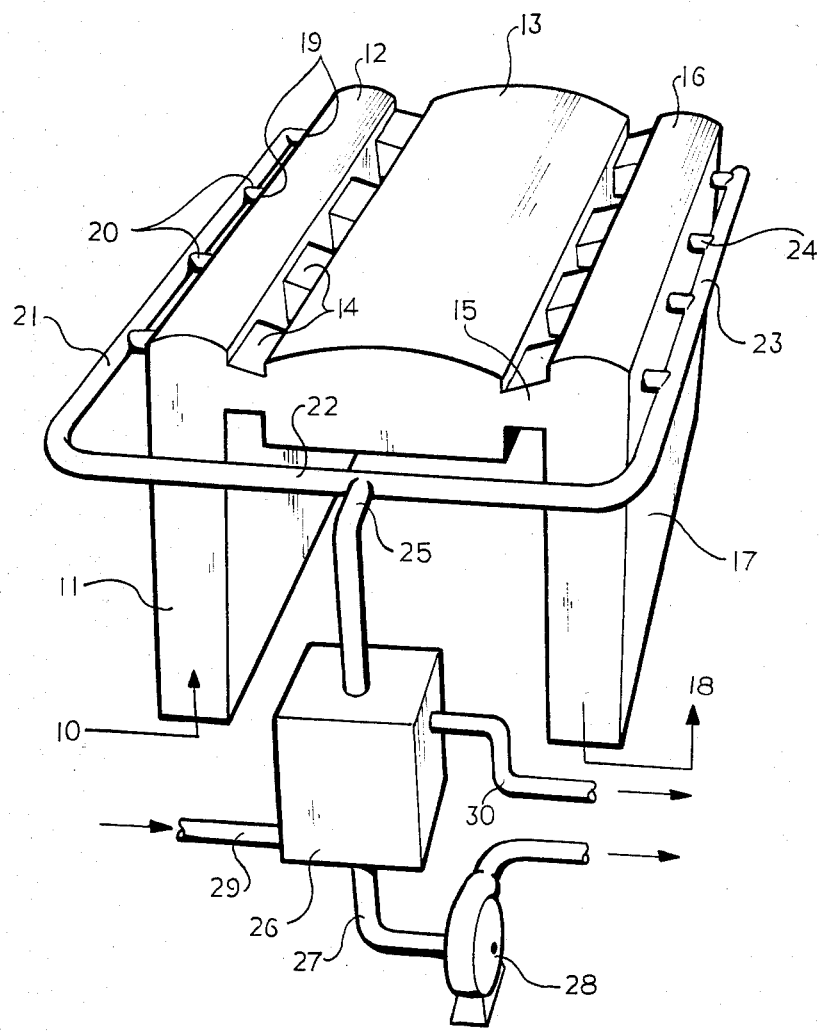
FIG. 1 is a schematic plan view of a side port regenerative glass melting furnace adapted to practice the present invention.

The attached drawing of FIG. 1 shows a regenerative glass melting furnace of the side-port type wherein the ambient temperature air enters at 10 into the bottom of a brick checkerwork 11. The air in a typical glass melter will be at about −0.1 psi static pressure at this inflow point. The combustion air will flow upwardly into an upper structure 12, which forms an elongated chamber running along the side of a melter 13. The melter 13 is in the form of a covered, rectangular chamber which communicates with the upper structure 12 of the checkerworks 11 through a series of firing ports 14. The firing ports 14 are at spaced intervals along the side of the melter and combustion air mixed with gas or other fuel is introduced through these ports into the melter.

The products of combustion pass from the melter 13 through a series of ports 15 located on the opposite side of the melter 13. These ports 15 open into a chamber 16, which extends along essentially the full length of the melter 13 and is the upper structure of the right hand or right side checkerworks 17. The pressure in the melter 13 will normally be at approximately +0.05 psi, while the static pressure within the upper right side checkerwork, when serving as the exhaust side, will be at approximately 0.0 psi static pressure. The exhaust which enters the chamber 16 moves downwardly through the right side checkerworks and heat within the exhaust is absorbed into the brickwork forming the right side checkerwork. After passing downward through the checkerworks, the exhaust will exit at the bottom at 18 where the static pressure will in normal operation be approximately −0.5 psi.

Upon reversal of the furnace, that is, when the furnace reverses and the exit 18 becomes the air inlet and the inlet then becomes the exhaust exit and the inlet air is preheated by passing upwardly through the right side checkerworks and the ports 15 then become firing ports, the pressure indicated for the various positions on the furnace will become just the reverse.

Connected to the upper structure 12 at a plurality of points 19 are connecting ducts 20, which have their outer ends connected together by a manifold 21. The manifold 21 is connected to an interconnecting duct 22 to a right side manifold 23 similar to manifold 21. The right side manifold 23 is connected by connecting ducts 24 to the chamber 16, which is formed at the upper end of the right side checkerworks 17. Intermediate the length of the duct 22, there is a "T" connection 25 which extends to a heat exchanger 26. The heat exchanger has an exhaust outlet 27 connected to an exhaust blower or stack fan 28. The heat exchanger also will have a secondary fluid inlet 28 and outlet 29 leading to the desired heat-utilizing system.

In the operation of the apparatus as shown for providing a source of clean heated air useable in the heat exchanger 26, the pressure at the inlet to the exchanger will be approximately 0.0 psi, while the inlet to the exhaust blower or the outlet 27 from the heat exchanger will be at a slightly reduced pressure below atmospheric. Thus, it can be seen that during the operation of the regenerative furnace the top of the combustion air side of the checkerworks is always at a slightly positive static pressure, while the top of the exhaust side checkerworks is always at a zero static pressure and the duct 22, which connects between the manifolds 21 and 23, will under normal circumstances provide a bypass for the heated air on the combustion air side to pass over to the lower pressure side where the air is in essence at static pressure of zero. However, the inlet to the heat exchanger 26 at the "T" 25 is also maintained at a zero static pressure condition by the stack fan 28. Thus, the preheated air exiting through the connecting ducts 20 into the manifold 21 will flow down through the air connecting duct 22 into the "T" and then into the heat exchanger and exit out of the heat exchanger with the heat exchanger extracting a considerable amount of heat from the moving stream of heated air. It should be kept in mind that the furnace will be operated with a somewhat excessive amount of preheat combustion air and this preheat or combustion air passes upwardly through the regenerator, and at the top thereof where it is extracted, it will be at its greatest temperature prior to its being mixed with the natural gas or other fuel at the time of combustion with the flames extending from the ports 14. The temperature of the air which is exiting from the chamber or upper structure 12 of the regenerator 11 will be in the order of 1500° F. to 2000° F. In the prior application of extracting heat from the preheat side of the furnace, as set forth in the above-referred-to U.S. Pat. No. 4,407,669, it was thought to be necessary, since a regenerating furnace reverses flow direction periodically every 30 minutes, that such a system would require valves between the heat exchanger and each regenerator so as to alternate the extraction air source with regenerator reversals. If one were to try to extract hot air at temperatures in excess of 1500° F., then sophisticated high temperature valves and equipment would be required.

The present invention, however, recognizes that for a regenerative furnace the top of the combustion air regenerator is always under positive static gauge pressure, while the top of the waste gas regenerator is always essentially at zero static gauge pressure, that is, atmospheric pressure. Thus, a small duct connecting the top of the air regenerator directly to the top of the waste gas regenerator would allow hot air to flow directly from the air regenerator upper structure to the waste gas generator upper structure without passing through the melter. By providing a "T" connection in this duct with the static gauge pressure at the "T" maintained near zero, then virtually all of the flow extracted at the "T" connection will be hot air. This hot air stream extracted from the system will automatically reverse with the normal regenerator reversals without the need for any high temperature valve in the extraction duct work. The static pressure at the "T" connection is maintained at zero by the proper selection of the size of the ducts being used to connect the regenerators thereto. Even in the situation where the pressure at the "T" is slightly greater than atmospheric pressure, then a small amount of hot air would escape to the waste gas upper structure. If the pressure at the "T" were slightly less than atmospheric pressure, then a small amount of waste gas might be extracted with the hot air stream. In the most extreme case, if the pressure at the "T" is very low, that is, much less than atmospheric pressure, then the extracted stream would be about 50% air and 50% waste gas. It should also be noted that if the "T" connection is made at elevations different from that of the regenerator upper structure, then the same relative effects occur, but the actual gauge pressures at the "T" would be affected by the buoyant forces acting on the vertical columns of gases in the ducts. Regardless, and as shown in the Figures of the drawing, if the ducts and pressures are properly scaled, hot air extraction is possible from a regenerative system without the requirements of expensive high temperature valves to facilitate the reversals.

Figure 2:
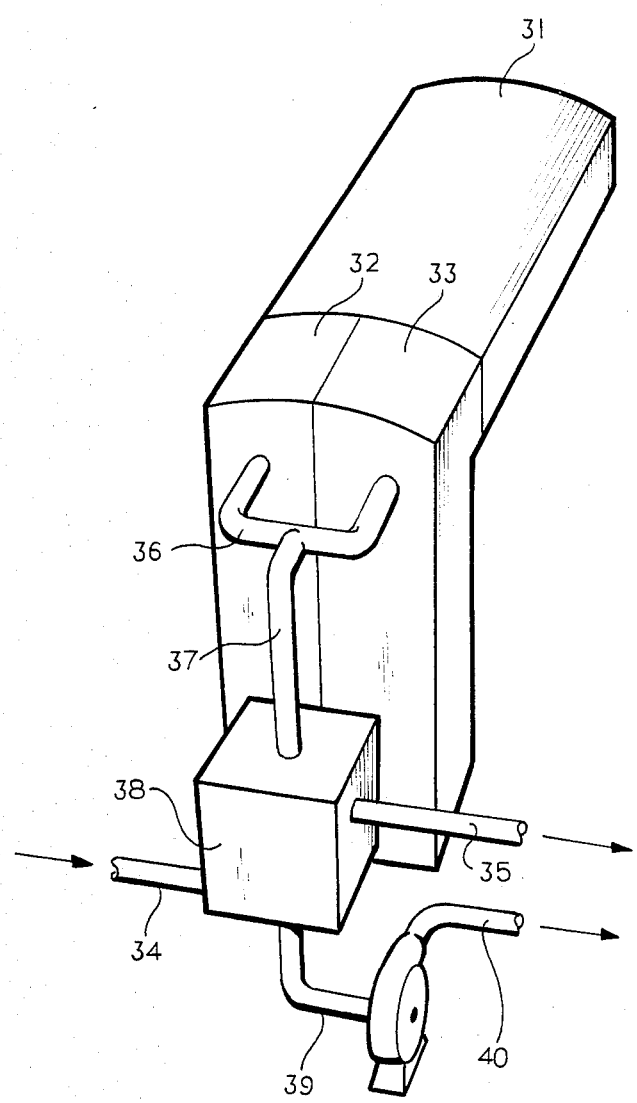
FIG. 2 is a schematic plan view of the invention applied to an end-port furnace.

The foregoing description has been directed to the utilization of the invention in the operation of a side port glass melting furnace; however, there are also end port fornaces where the combustion air regenerator and exhaust gas regenerator are side-by-side and in this regard reference may be had to FIG. 2.

In FIG. 2 there is shown an end port furnace 31 to which side-by-side regenerators 32 and 33 are connected. In the end port furnace the two regenerators usually have a common wall and the combustion air will enter at 34 and the exhaust gases will exit at 35. Both of the regenerators have chambers at the tops thereof which are also isolated from each other by a vertical wall.

A duct 36, which extends outwardly from the upper chambers, is in communication at its end with each of the upper chambers of the regenerators 32 and 33. A branch pipe or duct 37 is connected to the middle of the duct 36. The pipe 37, as in the embodiment of FIG. 1, extends downwardly to a heat exchanger 38 with an outlet 39 from the heat exchanger being connected to a blower 40. The heat exchanger has an inlet 41 and an outlet 42 to the secondary, which carries the working fluid that is heated by passing through the heat exchanger. The working fluid may have any of several possible uses, such as batch preheating, system water heating or cogeneration of electric power.

Thus, it can be seen that with both embodiments of the structure described, and operated in accordance with the method taught herein, that a supply of clean heated air that normally would be considered waste heat is recoverable and will be economically feasible so long as its end use is economically important. In the normal furnace operation, the temperature of the exhausting gases from the bottom of the regenerator which are normally fed to an exhaust stack will be in the order of 800° F., and it can be seen that this constitutes a significant loss of heat and a significant waste of heat. With the operation of the system described herein, this exhaust waste heat temperature will be considerably less and the penalty in fuel requirements will be offset by the economic advantage obtained from having a 1500°-2000° F. source of essentially clean preheated air useable in a heat exchanger without the previously considered dirty environment situation and without requiring expensive high temperature valves.

Furthermore, it will be feasible to connect the outlet from the blower 28 to the air supply (not shown) to the furnace and, in effect, recycle the heat in the clean air that has been through the heat exchanger back into the combustion air supply entering the system through the conventional furnace reversal valve.

We claim:

1. A method of extracting clean hot gases from a reversing regenerative furnace having a pair of regenerators for preheating combustion air on the inlet side and extracting waste gas heat on the exhaust side, comprising the steps of providing a duct extending between the upper air inlet side and upper exhaust outlet side of the furnace regenerators, tapping the duct intermediate its length and passing the tapped air in the duct to a heat-utilizing system to recover the heat from said air.

2. The method of claim 1, further including the step of maintaining a pressure differential between the air inlet side of the furnace and the exhaust side of the furnace thereby assuring flow of hot air from the air inlet side toward the exhaust side of the furnace regardless of the reversal of the furnace firing from side to side.

3. The method of recovering clean hot air from a regenerative glass melting furnace, comprising the steps of connecting a duct between the tops of the combustion air regenerators, providing a tap adjacent the midpoint of the length of said duct, and extracting the hot air at the tap for use outside the furnace system.

4. The method of claim 3, further including the step of passing the hot, clean air from the tap through a heat exchanger.

5. A valveless apparatus for extracting heat from a portion of the preheated air at elevated temperatures of 1000° F.-2000° F. of a reversing type regenerative furnace having a pair of regenerators connected to opposed areas of the furnace and means for reversing the flow of combustion air and exhaust gases at regular intervals to said regenerators, the improvement comprising a small generally horizontal, duct means extending between the pair of the regenerators and communicating with the comparable zones of said regenerators, a "T" connection in said small duct, and a heat exchanger connected to said "T".

6. The apparatus of claim 5, further including means connected to the outlet of said heat exchanger for creating a flow of hot air from the "T" through said heat exchanger.

7. The apparatus of claim 5 wherein said means for creating a flow of hot air comprises a blower having its inlet connected to the heat exchanger outlet and its outlet connected to the air inlet side of the furnace.

* * * * *